(12) United States Patent
Zhang et al.

(10) Patent No.: US 9,415,764 B2
(45) Date of Patent: Aug. 16, 2016

(54) METHODS AND SYSTEMS FOR IMPROVING HYBRID VEHICLE PERFORMANCE CONSISTENCY

(71) Applicant: Ford Global Technologies, LLC, Dearborn, MI (US)

(72) Inventors: Chen Zhang, Westland, MI (US); Xiaoyong Wang, Novi, MI (US); Mark Steven Yamazaki, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 111 days.

(21) Appl. No.: 14/328,388

(22) Filed: Jul. 10, 2014

(65) Prior Publication Data

US 2016/0009270 A1    Jan. 14, 2016

(51) Int. Cl.
  *B60W 10/06* (2006.01)
  *B60W 10/08* (2006.01)
  *B60K 6/48* (2007.10)
  *B60W 10/02* (2006.01)

(52) U.S. Cl.
  CPC ............... *B60W 10/08* (2013.01); *B60K 6/48* (2013.01); *B60W 10/02* (2013.01); *B60W 10/06* (2013.01); *B60W 20/13* (2016.01); *B60W 20/19* (2016.01); *Y10S 903/93* (2013.01)

(58) Field of Classification Search
  CPC .................................................. B60W 20/106
  See application file for complete search history.

(56) References Cited

U.S. PATENT DOCUMENTS

| 6,512,967 | B2 | 1/2003 | Östberg et al. | |
| 7,753,150 | B2 | 7/2010 | Tamor | |
| 7,957,855 | B2 | 6/2011 | Seo et al. | |
| 9,074,683 | B2* | 7/2015 | Sato | B60K 23/00 |
| 2015/0066333 | A1* | 3/2015 | Butcher | F02D 29/02 701/102 |
| 2015/0183424 | A1* | 7/2015 | Kim | B60W 20/40 701/22 |
| 2015/0314773 | A1* | 11/2015 | Zhou | B60W 10/06 701/22 |

* cited by examiner

*Primary Examiner* — Sherry Estremsky
(74) *Attorney, Agent, or Firm* — David Kelley; Alleman Hall McCoy Russell & Tuttle LLP

(57) ABSTRACT

Systems and methods for improving hybrid vehicle performance and efficiency attributes are presented. In one example, an electric machine maximum available torque is controller limited so as to improve conservation of battery charge and driveline performance consistency. The electric machine torque may be limited as a function of driveline speed, battery discharge limit, and other parameters.

19 Claims, 5 Drawing Sheets

METHODS AND SYSTEMS FOR IMPROVING HYBRID VEHICLE PERFORMANCE CONSISTENCY

FIELD

The present description relates to a system and methods for improving steady performance consistency of a hybrid vehicle. The methods may be particularly useful for hybrid vehicles that include an electric motor or generator that may be selectively coupled to an engine.

BACKGROUND AND SUMMARY

A hybrid vehicle's performance may be based on performance of an engine and performance of a driveline integrated starter/generator (DISG). The hybrid vehicle's maximum torque curve (e.g., the hybrid vehicle's driveline torque at a torque converter impeller below which driveline torque is maintained at all times the maximum is in effect) may be a summation of the engine's maximum torque curve (e.g., engine torque below which engine torque is maintained at all times the maximum is in effect) and the DISG's maximum torque curve (e.g., electric machine torque below which electric machine torque is maintained at all times the maximum is in effect). A driver may request up to the combined maximum torque of the DISG and the engine during driving conditions. The engine may provide a rather consistent maximum torque at a predetermined speed. The engine's maximum torque varies as a function of barometric pressure, engine speed, engine temperature, and fuel combusted. On the other hand, the motor's maximum torque may vary more significantly based on motor temperature, battery state of charge (SOC), and motor speed. Consequently, when an engine's maximum torque curve is added to a DISG's maximum torque curve, the resulting maximum torque curve for the vehicle driveline may exhibit significant changes in maximum driveline torque over operating conditions.

A driver may notice significant changes in driveline torque over a driving cycle with a heavy accelerator pedal tip-in as SOC is reduced and as DISG maximum torque is reduced. For example, the hybrid vehicle may begin a drive cycle being able to accelerate at a first rate, and the hybrid vehicle may end the drive cycle being able to accelerate at a second rate, the second rate slower than the first rate. The driver may find the reduction in acceleration to be objectionable. Therefore, it may be desirable to provide more consistent vehicle performance over a drive cycle.

The inventors herein have recognized the above-mentioned disadvantages and have developed a driveline method, comprising: adjusting a maximum driveline torque threshold in response to driveline speed and a battery discharge power limit; and limiting driveline torque in response to the maximum driveline torque threshold.

By adjusting a maximum driveline torque threshold in response to driveline speed and battery discharge power limit (e.g., a battery discharge power level which the battery discharge power is prevented from exceeding), the technical result of improving driveline performance consistency may be achieved. For example, battery charge may be conserved at higher driveline speeds where electric machine output torque may be reduced by not supplying torque from the electric machine to the driveline. At lower speeds, the conserved charge may be used to provide torque to the driveline. In this way, it may be possible to increase the number of vehicle launches where the electric machine assists an engine to launch the vehicle. Consequently, a driver may experience fewer situations when the electric machine is unavailable or operating in a reduced torque mode during vehicle launch conditions.

The present description may provide several advantages. Specifically, the approach may improve driveline performance consistency. Further, the approach may provide driveline responses tailored for specific driving modes. Additionally, the approach may be applied to hybrid vehicles that include gasoline, diesel, or gaseous fueled engines.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
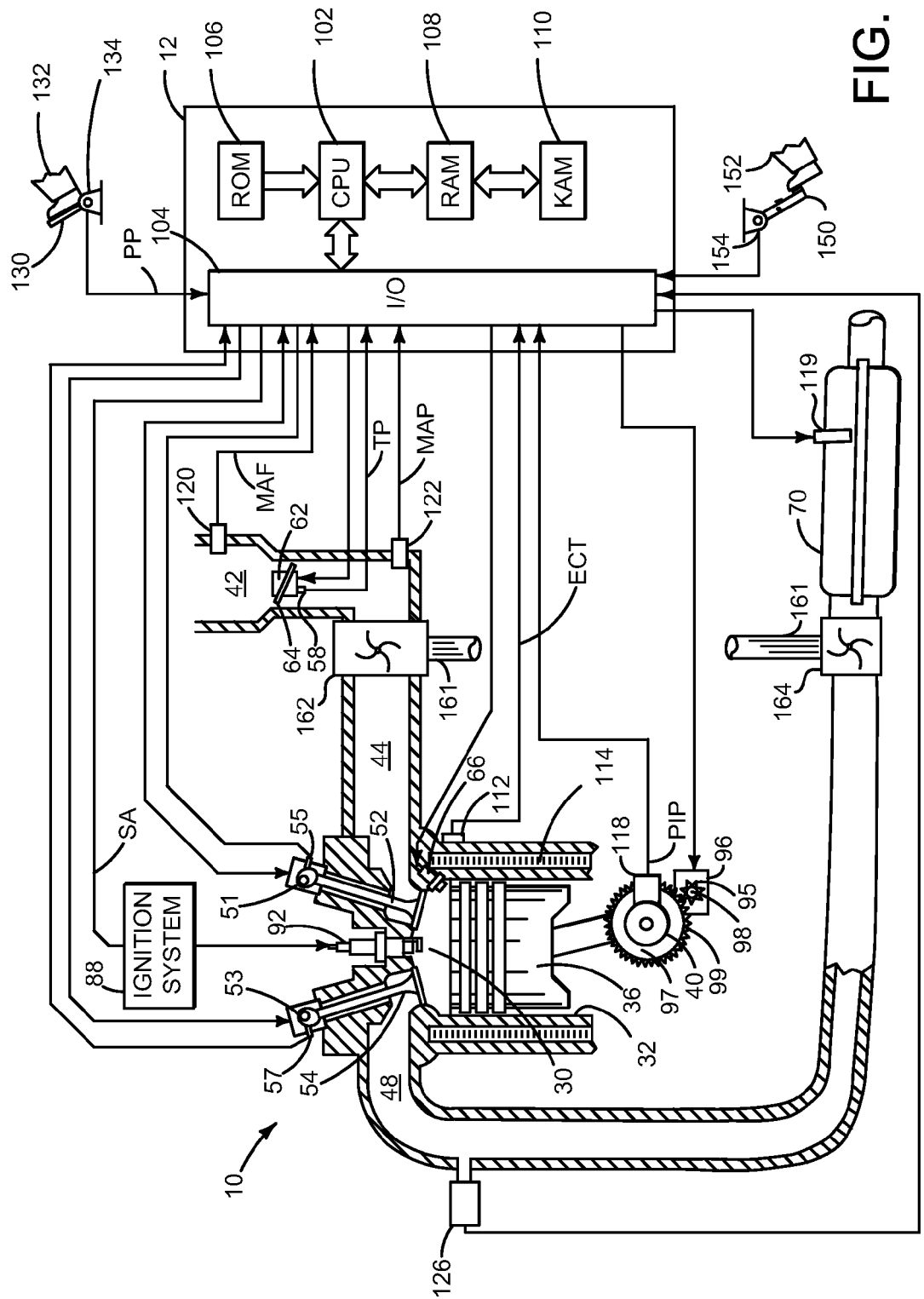
FIG. 1 is a schematic diagram of an engine.
Figure 2:
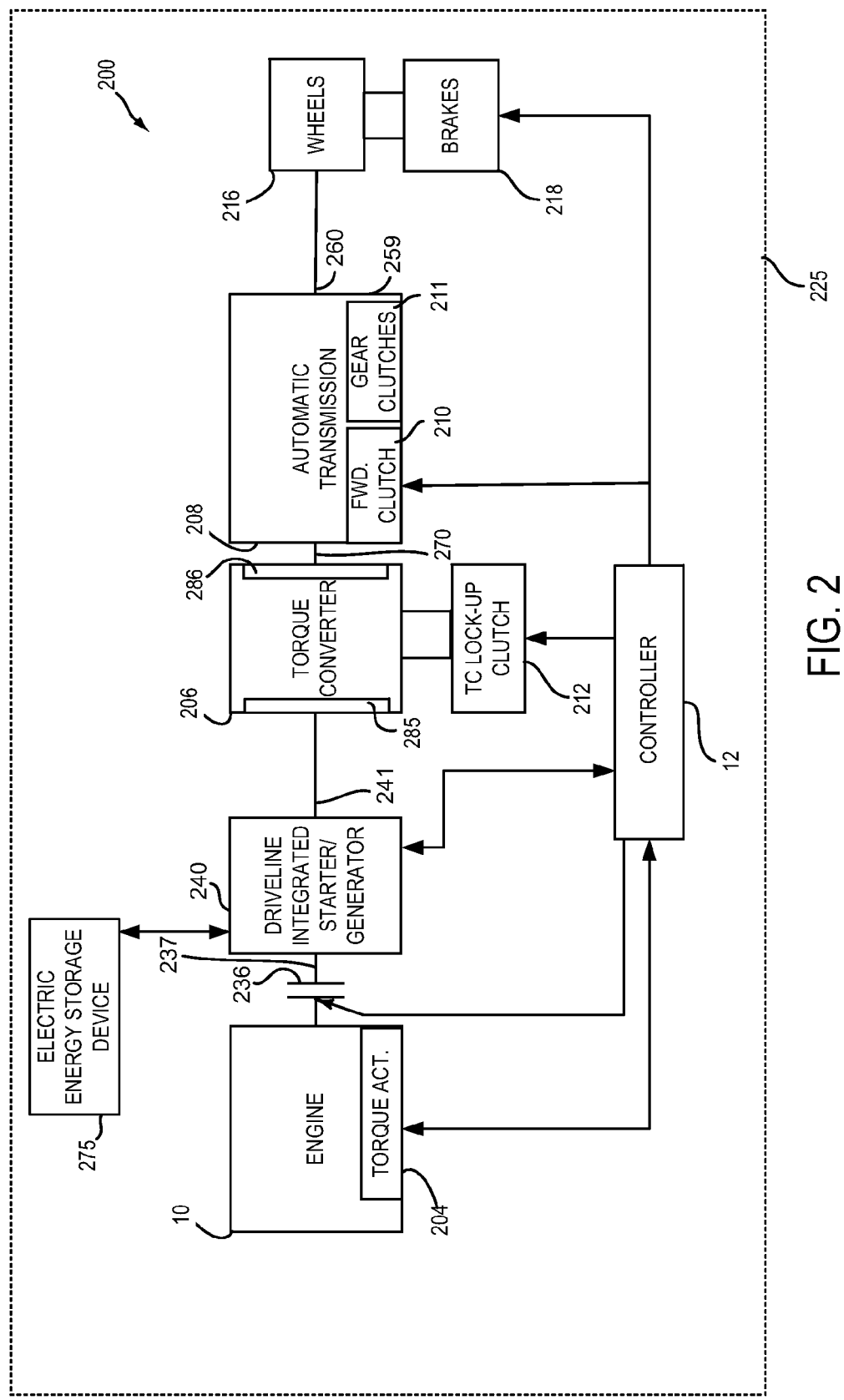
FIG. 2 shows an example vehicle driveline configuration.
Figure 3:
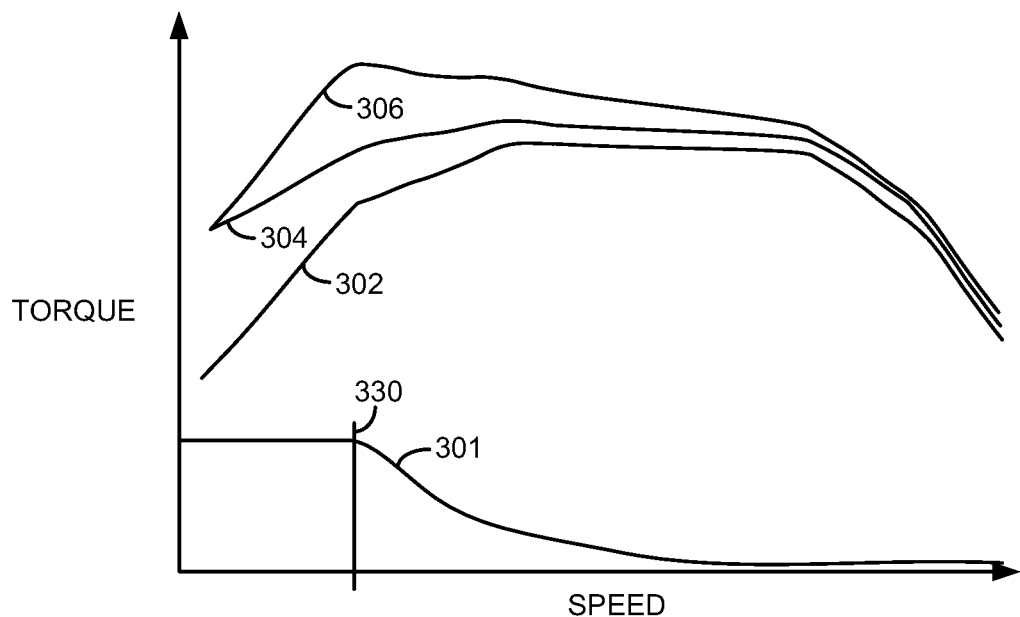
FIGS. 3 and 4 show different driveline torque curves.
Figure 4:
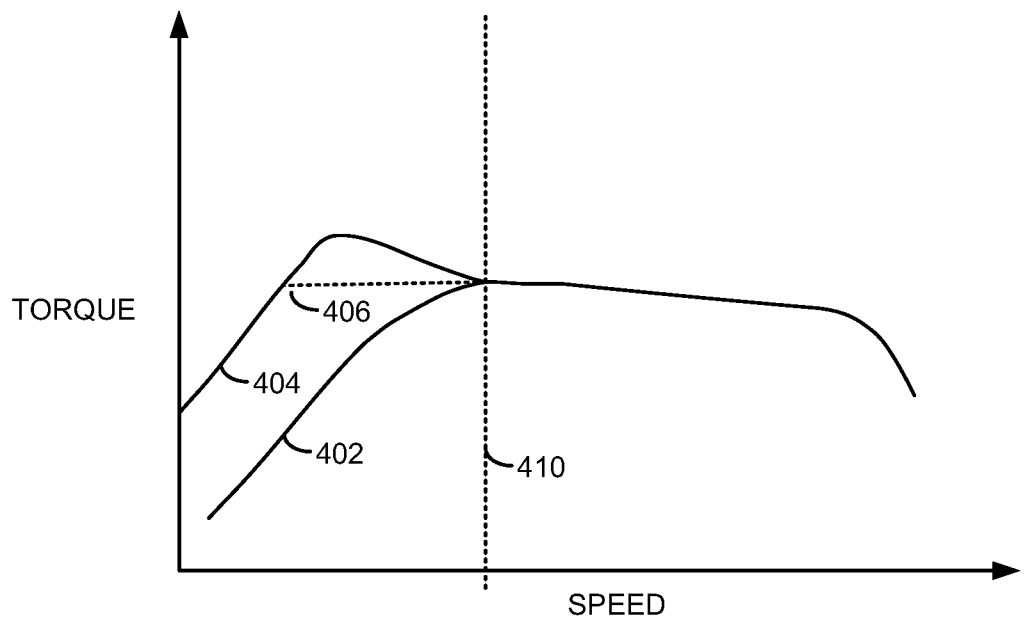
Figure 5:
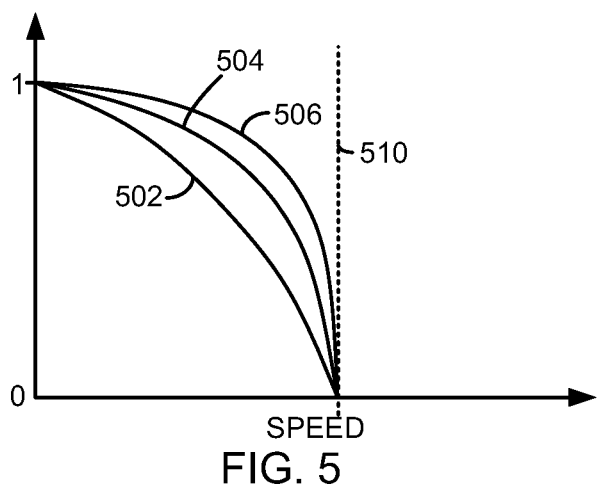
FIGS. 5-7 show different DISG torque adjustments to improve driveline performance consistency.
Figure 6:
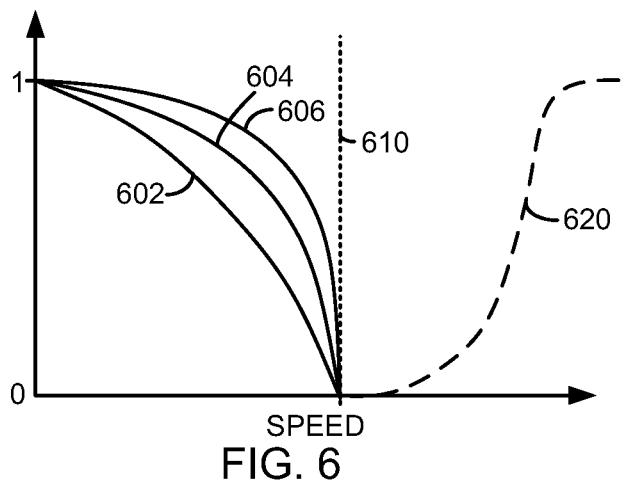
Figure 7:
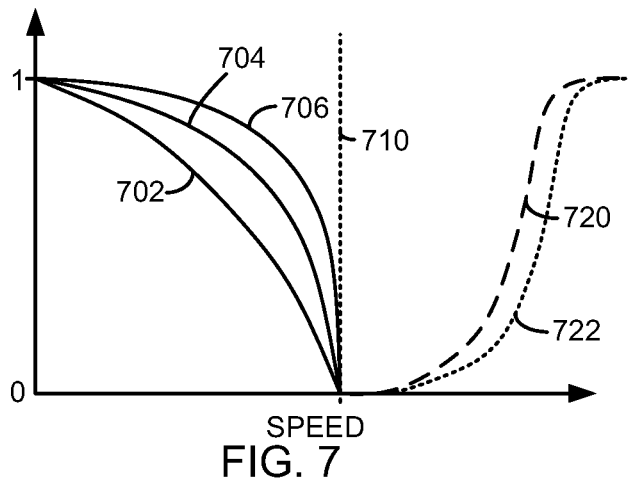
Figure 8:
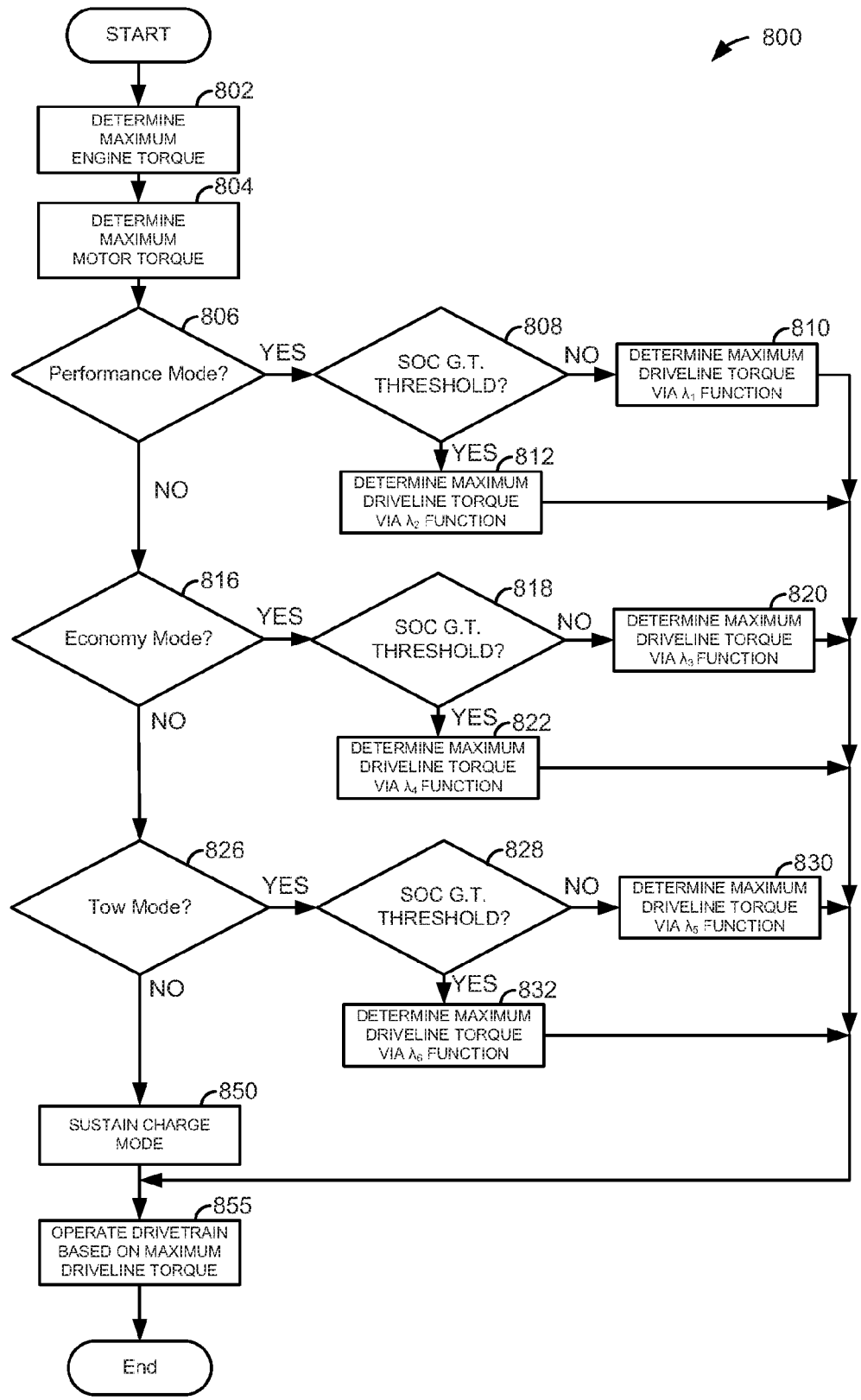
FIG. 8 shows an example method for improving driveline performance consistency over a vehicle drive cycle.

The present description is related to improving hybrid vehicle driveline performance consistency over a vehicle drive cycle. The driveline may include an engine as is shown in FIG. 1. The engine may be mechanically coupled to other vehicle components to form a driveline as is shown in FIG. 2. A torque curve for a hybrid driveline where engine and DISG torques are added is shown in FIG. 3. An example hybrid driveline torque curve for providing more consistent driveline performance is shown in FIG. 4. DISG torque adjustments to extend consistent driveline performance over a vehicle drive cycle are shown in FIGS. 5-7. Finally, a method for improving hybrid driveline performance over a vehicle drive cycle is shown in FIG. 8.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width from controller 12. Fuel is delivered to fuel injector 66 by a fuel system (not shown) including a fuel tank, fuel pump, and fuel rail (not shown).

In addition, intake manifold 44 is shown communicating with turbocharger compressor 162. Shaft 161 mechanically couples turbocharger turbine 164 to turbocharger compressor 162. Optional electronic throttle 62 adjusts a position of throttle plate 64 to control air flow from air intake 42 to compressor 162 and intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200. The driveline of FIG. 2 includes engine 10 shown in FIG. 1. Driveline 200 may be powered by engine 10. Engine 10 may be started with an engine starting system shown in FIG. 1 or via driveline integrated starter/generator (DISG) 240. DISG 240 may also be referred to as an electric machine, motor, and/or generator. Further, torque of engine 10 may be adjusted via torque actuator 204, such as a fuel injector, throttle, etc.

An engine output torque may be transmitted to an input side of driveline disconnect clutch 236. Disconnect clutch 236 may be electrically or hydraulically actuated. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by craning engine 10 and resuming cylinder combustion.

Thus, the system of FIGS. 1 and 2 provides for a driveline system, comprising: an engine; an electric machine; a driveline disconnect clutch selectively coupling the engine and the electric machine; and a controller including executable instructions stored in non-transitory memory for closing the driveline disconnect clutch and limiting driveline maximum torque to less than a sum of maximum engine torque and maximum electric machine torque. The driveline system includes where driveline maximum torque is an amount of torque the electric machine and engine simultaneously output in response to a wide open pedal position.

In some examples, the driveline system includes where maximum electric machine torque is limited based on a function of driveline speed independent from electric machine operating characteristics. The driveline system includes where maximum electric machine torque is limited based on a function of a battery discharge power limit. The driveline system also includes where the maximum electric machine torque is limited based on a maximum engine torque over a driveline speed range.

Referring now to FIG. 3, a plot showing driveline maximum torques at various operating conditions is shown. The plot's Y axis represents driveline torque at the transmission impeller and torque increases in the direction of the Y axis arrow. The plot's X axis represents driveline speed at the transmission impeller and speed increases in the direction of the X axis arrow.

Curve 301 represents a maximum torque curve for a DISG or motor when the battery supplying the motor is at its maximum or rated discharge limit and when DISG temperature is at a predetermined temperature that is less than a threshold temperature. Curve 301 is comprised of a plurality of maximum torque amounts for the DISG at different DISG or driveline speeds. The DISG outputs a constant torque from zero speed until the speed at vertical marker 330 is reached. The DISG changes from a constant torque mode to a constant power mode at speeds greater than the speed at marker 330. Thus, DISG torque declines after the speed at 330.

Curve 302 represents maximum driveline torque when the engine is solely supplying torque to the driveline during warmed up conditions at a static altitude. The engine torque increases from lower speeds to higher speeds and then decreases as engine speed continues to increase. Curve 302 is comprised of a plurality of maximum torque amounts for the engine at different engine or driveline speeds. Thus, the engine delivers lower torque at lower and higher engine speeds.

Curve 306 represents maximum driveline torque when the engine and the DISG supply torque to the driveline at full capacity for the DISG and engine. Curve 306 is comprised of a sum of a plurality of maximum torque amounts for the DISG and engine at different DISG and engine driveline speeds. The engine provides the same amount of torque as shown in curve 302 since the engine torque is based on the same engine operating conditions. The additional torque that may be supplied to the driveline by the DISG is the difference between curve 306 and curve 302. DISG maximum torque is constant from zero speed to a speed where the DISG changes from providing constant torque to providing constant power. Thus, it may be observed that DISG maximum torque is at a higher level at lower speeds and decreases at higher speeds.

Curve 304 represents maximum driveline torque when the engine and DISG supply torque to the driveline at less than full capacity for the DISG. The DISG may provide a reduced maximum torque as compared to the torque of curve 301 based on its present operating conditions. For example, DISG maximum torque may be reduced when a battery supplying power to the DISG is at a low battery discharge limit. DISG maximum torque may also be reduced based on DISG temperature and other operating conditions. Thus, maximum combined engine and DISG torque may vary between curves 302 and 306 depending on DISG operating conditions.

It may be observed that if a driver demands maximum torque from the driveline, the maximum driveline torque will depend on DISG and battery operating conditions. If a vehicle is departs on a journey starting with a fully charged battery, vehicle acceleration from stop may deteriorate as a battery discharge limit is reduced. A driver may notice this driveline behavior and may find it to be objectionable. The most notable change in driveline torque may be observed at low speed conditions where the reduction in vehicle acceleration may be most noticeable.

Turning now to FIG. 4, a plot of how driveline performance may be extended over at least a portion of a vehicle drive cycle (e.g., from a time a driver urges the vehicle to begin to travel a driving route until the time the vehicle reaches its destination and is stopped) is shown. The plot's Y axis represents torque and torque increases in the direction of the Y axis arrow. The plot's X axis represents driveline speed at the torque converter impeller. Vertical line 410 represents a driveline speed of interest.

Curve 402, similar to curve 302 of FIG. 3, represents maximum driveline torque when the engine is solely supplying torque to the driveline during warmed up conditions at a static altitude. Curve 404 represents maximum driveline torque when the DISG and engine are supplying torque to the driveline while applying the method of FIG. 8 for improving driveline performance consistency over at least a portion of a drive cycle. Curve 404 may be a maximum driveline torque curve in a performance mode. Curve 404 is comprised of a plurality of summed DISG and engine torque values over the driveline speed range.

Curve 406 follows curve 404 except where curve 406 is shown as a dashed line. Curve 406 may be the maximum driveline torque for a tow mode. The maximum driveline torque is held substantially constant (e.g., within +2% of full scale maximum driveline torque) in tow mode after the maximum driveline torque matches or is equal to the maximum engine torque over the driveline speed range (e.g., the greatest engine torque amount over the driveline speed range, the engine torque at 410). At lower engine speeds where maximum engine torque plus maximum DISG torque is less than the maximum engine torque over the driveline speed range (e.g., engine torque at 410), the maximum driveline torque is the sum of the maximum DISG torque and the maximum engine torque at the particular speed. Once maximum engine torque plus maximum DISG torque is greater than the maximum engine torque over the driveline speed range (e.g., the engine torque at 410), the maximum driveline torque is held to the maximum engine torque. The DISG does not supply torque to the driveline at driveline speeds greater than 410 in this example of tow mode.

In this example, the DISG torque augments engine torque supplied to the driveline up to the speed at 410. The speed at 410 corresponds to speed where engine torque is a maximum over the engine speed range. The DISG does not supply torque to the driveline at driveline speeds greater than 410. By not providing DISG torque above threshold speed 410, it may be possible to save battery charge supplying electrical power to the DISG. The saved charge may then be applied at lower engine speeds so that the driveline may produce maximum torque at lower driveline speeds (e.g., where motor and engine torque may operate at full capacity), thereby increasing the amount of time the driver may have access to a higher maximum torque.

Providing torque via the DISG at lower engine speeds may be desirable for turbocharged engines where turbocharger lag may occur. The speed above which the DISG torque is not provided to the driveline may be based on engine speed and torque, DISG speed, boost pressure, or other operating conditions. For example, DISG torque may not be available to the driveline after boost pressure reaches a threshold boost pressure. In this way, the DISG maximum torque available to a driveline may be adjusted so as to provide more consistent torque over a driving cycle.

It should also be noted that the method described herein provides for adjusting the maximum driveline torque as desired to meet particular vehicle requirements. Therefore, in other examples, DISG torque may be supplied to the whole range of driveline speed, or only be supplied to the driveline at driveline speeds above a threshold speed (e.g., higher driveline speeds) or in selected driveline speed ranges that may be defined by a lower driveline speed limit (e.g., a do not provide DISG torque below the speed) and an upper driveline speed limit, for example.

Referring now to FIG. 5, a first example plot of a function $\lambda$ for establishing a maximum DISG torque is shown. The DISG maximum torque may be added to an engine maximum torque to provide a driveline maximum torque as is described in the method of FIG. 8. The use of $\lambda$ is also explained in greater detail in the method of FIG. 8.

The function $\lambda$ includes one or more curves that are based on a plurality of torque ratios, and each of the one or more curves corresponds to a different a battery discharge power limit. In particular, a torque ratio that forms the one or more curves is allowable DISG torque divided by maximum DISG torque. Allowable DISG torque is a calibrated predetermined DISG torque that conforms to DISG and vehicle requirements at a specified battery discharge power limit and DISG temperature. The maximum DISG torque is the torque provided by the DISG at the maximum battery discharge limit at a specified temperature. For example, the allowable DISG torque may be 200 N-m and the maximum DISG torque may be 250 N-m for a particular set of operating conditions. Therefore, the $\lambda$ value at the particular operating conditions is 200/250=0.8. In another example, where the battery discharge power limit is reduced, the allowable DISG torque may be 100 N-m and the maximum DISG torque may be 100 N-m. Consequently, the $\lambda$ value at the particular operating conditions is 100/100=1.0. It should be noted that the battery discharge power limit may be expressed in kW or Watts.

The Y axis represents a $\lambda$ value that varies between 0 and 1. The X axis represents driveline speed at the torque converter impeller. Vertical line 510 represents a driveline speed where $\lambda$ equals zero. Lambda is a multiplier that operates on a maximum DISG torque curve which is a function of DISG speed. The maximum DISG torque curve represents the DISG torque at the battery's present discharge limit and DISG temperature.

The plot shows three curves but more curves may be provided if desired, and values of $\lambda$ between the curves may be found by interpolating between the curves. Curve 502 represents the values of $\lambda$ for a first battery discharge power level or limit as DISG speed varies. Curve 504 represents the values of $\lambda$ for a second battery discharge power level or limit as DISG speed varies. Curve 506 represents the values of $\lambda$ for a third battery discharge power level or limit as DISG speed varies. At a DISG speed of zero (e.g., at the Y axis intercept) the $\lambda$ value is one for each of curves 502-506. At speed 510 the $\lambda$ equals zero for each of curves 502-506.

Between zero speed and speed at 510, each curve bends downward. Curve 502 tends to a value of zero before curves 504 and 506, but it approaches zero at a lower rate than curves 504 and 506. Curve 502 represents the $\lambda$ values for conditions when a battery discharge power limit is higher. A battery discharge power limit may be empirically determined and stored in memory. The battery discharge limit may be empirically determined and based on battery SOC, battery temperature, number of charge and discharge cycles, and usage time since no current was drawn or supplied by a battery. By approaching a value of zero at lower speeds, the ratio of allowable motor torque over maximum motor torque is reduced at lower speeds as compared to the maximum motor torque when curves 504 and 506 are used to determine maximum driveline torque. Curve 506 also tends to a value of zero as speed increases, but curve 506 remains near a value of one for higher speeds than curve 502. Consequently, when the maximum motor torque is multiplied by the appropriate $\lambda$ curve, DISG torques at different battery discharge power limits provide more consistent revised maximum motor torques. Curve 504 shows how values of $\lambda$ change when the battery discharge power limit (e.g., not to exceed battery discharge power limit) is between the value for curves 502 and 506. The maximum torque curve values are greater when curve 504 is applied as compared to when curve 502 is applied, but less than the value when curve 506 is applied.

The $\lambda$ value determined from DISG speed and the battery discharge power limit is multiplied by the maximum DISG torque curve at conditions for a specified battery discharge power limit and DISG temperature to provide a revised maximum DISG torque curve. The revised maximum DISG torque curve is added to the maximum engine torque curve to determine the maximum driveline torque curve. The maximum DISG torques at the various DISG speeds may represent the maximum DISG torque curve at the present battery discharge limit and present DISG temperature. The battery discharge power limit for curve 502 is greater than the battery discharge power limit for curve 504, and the battery discharge power limit for 506 is less than the battery discharge power limit for curve 504.

Thus, for this example, at driveline speeds less than the speed at 510, the revised maximum DISG torque may be reduced so that the maximum driveline torque is reduced. At driveline speeds greater than the speed at 510, DISG output torque is zero. Consequently, battery charge that might have been applied at higher driveline speeds to meet driver demand torque may be conserved and applied at lower driveline speeds to improve vehicle acceleration and extend consistent driveline performance.

Referring now to FIG. 6, it shows curves 602-606 that are identical to curves 502-506 of FIG. 5. Further, the plots have the same axes. Therefore, for the sake of brevity the description of these features will not be repeated. However, the description from FIG. 5 applies. Additionally, the speed at 610 is equivalent to the speed at 510.

FIG. 6 includes an additional curve 620 that starts at a value of zero and increases as driveline speed increases. In this example, the $\lambda$ starts to increase after a middle driveline speed range where DISG torque is not applied to the driveline based on a $\lambda$ value of zero. By increasing the $\lambda$ value at higher driveline speeds (e.g., speeds greater than 610) it may be possible to increase driveline torque a small amount while discharging the battery to increase battery charge storage capacity in anticipation for regeneration (e.g., when the DISG converts the vehicle's kinetic energy into electrical energy). The $\lambda$ value is multiplied by the DISG maximum torque capacity at a specified battery discharge power limit and DISG temperature to determine the maximum driveline torque curve when operating at present conditions. Thus, the $\lambda$ function shown in FIG. 6 may allow DISG torque to be delivered to the driveline for low speed conditions and high speed conditions but not middle range speed conditions.

Referring now to FIG. 7, it shows curves 702-706 and 720 that are identical to curves 602-606 and 620 of FIG. 6. Further, the plots have the same axes. Therefore, for the sake of brevity the description of these features will not be repeated. However, the description from FIG. 6 applies to these elements. Additionally, the speed at 710 is equivalent to the speed at 610.

FIG. 7 includes an additional curve 722 that starts at a value of zero and increases as driveline speed increases. Curve 722 increases from a value of zero at a higher speed than curve 730 increases from zero. In this example, the $\lambda$ value starts to increase after a middle driveline speed range where DISG maximum torque is zero based on a $\lambda$ value of zero. By increasing the $\lambda$ value at higher driveline speeds the ratio of allowable motor torque over maximum motor torque is increased to increase driveline torque a small amount while discharging the battery to increase battery charge storage capacity in anticipation for regeneration (e.g., when the DISG converts the vehicle's kinetic energy into electrical energy). The $\lambda$ value is multiplied by the DISG maximum torque capacity at the present battery discharge power limit and DISG temperature to determine the maximum driveline torque curve at present conditions. Thus, the $\lambda$ function shown in FIG. 7 may allow DISG torque to be delivered to the driveline for low speed conditions and high speed conditions but not middle range speed conditions.

The difference between curve 720 and curve 722 is that curve 722 is applied when the battery discharge limit is lower than that of when curve 720 is applied. Curve 722 increases $\lambda$ at higher driveline speeds than curve 720. By providing different $\lambda$ values based on different battery discharge power limits, it may be possible to provide more driveline torque at higher driveline speeds for higher battery discharge power.

Referring now to FIG. 8, a method for improving hybrid vehicle performance consistency is described. The method of FIG. 8 may apply the $\lambda$ functions described in FIGS. 5-7 to determine a maximum driveline torque during selected operating conditions. The method of FIG. 8 may be included in the system of FIGS. 1 and 2 as executable instructions stored in non-transitory memory.

At 802, method 800 determines a maximum engine torque. The maximum engine torque may be empirically determined via dynamometer testing. In one example, maximum engine torque values are stored in controller memory that is indexed via engine speed. The maximum torque values may be modified based on engine temperature and barometric pressure. For example, if the engine is presently operating at 800 RPM, the maximum engine torque at 800 RPM may be found by indexing a table using a speed value of 800 RPM. The table may output a value such as 220 N-m, but if the engine is operating at altitude the value may be reduced to 210 N-m, for example, based on barometric pressure. Method 800 proceeds to 804 after maximum engine torque is determined.

At 804, method 800 determines maximum DISG or motor torque. DISG torque may also be stored in memory that is indexed via DISG speed. A table in memory may output a maximum DISG torque based on a maximum battery discharge limit at present conditions and DISG temperature at present conditions. Method 800 proceeds to 806 after maximum DISG torque is determined.

At 806, method 800 judges if the vehicle is in a performance mode. A vehicle may be in a performance mode when a driver selects performance mode via a display panel or switch. If method 800 judges that the vehicle is in a performance mode, the answer is yes and method 800 proceeds to 808. Otherwise, the answer is no and method 800 proceeds to 816.

At 808, method 800 judges battery SOC is greater than a threshold. In one example, the threshold may be an upper threshold limit (e.g., 75% of a fully charged battery). If method 800 judges that SOC is greater than the threshold, the answer is yes and method 800 proceeds to 812. Otherwise, the answer is no and method 800 proceeds to 810.

At 810, method 800 determines the maximum driveline torque based on the maximum engine torque determined at 802 and maximum DISG torque determined at 804. In one example, maximum driveline torque is determined from the following equation:

$$T_{drv\_mx}(\omega)=T_{eng\_mx}(\omega,bp,temp)+\lambda_1(\omega,P_d,SOC)\cdot T_{mot\_mx}(\omega,P_d,mtr\_tmp)$$

where $T_{drv\_mx}$ is maximum driveline torque, w is driveline speed at the torque converter impeller, $T_{eng\_max}$ is maximum engine torque, by is ambient barometric pressure, temp is ambient temperature, $\lambda_1$ is a function limiting motor or DISG torque, $P_d$ is the battery discharge power limit, SOC is battery state of charge, mtr_tmp is motor temperature, and $T_{mot\_mx}$ is maximum motor or DISG torque at the present battery discharge power limit and DISG temperature. Thus, the maximum engine torque determined at 802 is added to the product of the $\lambda_1$ function and the maximum DISG torque determined at 804.

In one example, the $\lambda_1$ is a function of the form shown in FIG. 5 where there is a curve 502-506 for each battery discharge power limit. Thus, the $\lambda_1$ output is a value from 0 to 1 that scales the maximum DISG torque to provide a revised maximum DISG torque. The $\lambda_1$ function may include a third dimension (e.g., z axis) based on SOC that adjusts the multiplier in the $\lambda_1$ function based on SOC. Thus, in performance mode, the $\lambda_1$ allows more revised maximum DISG torque up to an engine speed where peak engine torque occurs (e.g., 410 of FIG. 4). At speeds higher than the speed where maximum engine torque occurs (e.g., 410 of FIG. 4), the $\lambda_1$ function output is zero, thereby making the DISG torque contribution to maximum driveline torque zero. In this way, battery energy that might have been used by the DISG at driveline speeds above the speed where engine torque is maximum is conserved to improve vehicle acceleration and to increase the number of accelerations where maximum engine torque and maximum DISG torque may be applied. Consequently, vehicle performance consistency may be improved. Method 800 proceeds to 855 after the maximum driveline torque is determined.

At 855, method 800 operates the driveline based on the maximum driveline torque. In one example, accelerator pedal position and vehicle speed are mapped into a driver demand torque and the driver demand torque is limited by the maximum driveline torque. If the driver transitions the accelerator pedal to wide open pedal, the DISG motor torque provides the maximum DISG torque scaled by the appropriate λ function as described at 810, 812, 820, 822, 830, and 832. In this way, the λ functions limit DISG output torque. The DISG output torque is limited by adjusting a maximum current that may be supplied to the DISG based on the scaled maximum available DISG torque. Method 800 proceeds to exit after the driveline is operated based on the appropriate selected λ function (e.g., the lambda function selected according to steps 806-850.

At 812, method 800 also determines the maximum driveline torque based on the maximum engine torque determined at 802 and maximum DISG torque determined at 804. In one example, maximum driveline torque is determined from the following equation:

$$T_{drv\_mx}(\omega)=T_{eng\_mx}(\omega,bp,temp)+\lambda_2(\omega,P_d,SOC)\cdot T_{mot\_mx}(\omega,P_d,mtr\_tmp)$$

where $T_{drv\_mx}$ is maximum driveline torque, w is driveline speed at the torque converter impeller, $T_{eng\_max}$ is maximum engine torque, by is ambient barometric pressure, temp is ambient temperature, $\lambda_2$ is a function limiting motor or DISG torque, $P_d$ is the battery discharge power limit, SOC is battery state of charge, mtr_tmp is motor temperature, and $T_{mot\_mx}$ is maximum motor or DISG torque at the present battery discharge power limit and DISG temperature. Thus, the maximum engine torque determined at 802 is added to the product of the $\lambda_2$ function and the maximum DISG torque determined at 804.

In one example, the $\lambda_2$ is a function of the form shown in FIG. 6 or 7 where there is a curve 602-606 for each battery discharge power limit. Further, there is at least one of curve 620 and 722. Thus, the $\lambda_2$ output is a value from 0 to 1 that scales the maximum DISG torque to provide a revised maximum DISG torque. The $\lambda_2$ function may include a third dimension (e.g., z axis) based on SOC that adjusts the multiplier in the $\lambda_2$ function based on SOC. Thus, in performance mode, the $\lambda_2$ allows the maximum DISG torque when the battery discharge limit is at its maximum level up to an engine speed where peak engine torque occurs (e.g., 410 of FIG. 4). At speeds higher than the speed where maximum engine torque occurs (e.g., 410 of FIG. 4), the $\lambda_2$ function is zero for a middle speed range and then increases at higher driveline speeds, thereby making the DISG torque contribution to maximum driveline torque zero during middle driveline speed and increasing the DISG torque at higher driveline speeds. In this way, battery energy that might have been used by the DISG at driveline speeds above middle range speeds may be applied at low driveline speeds to accelerate the vehicle and higher driveline speeds to reduce battery capacity in preparation for the vehicle entering a regeneration mode. Consequently, vehicle performance consistency may be improved via providing more consistent torque levels during acceleration and by providing battery storage capacity in anticipation of the vehicle entering a regeneration mode. Method 800 proceeds to 855 after the maximum driveline torque is determined.

At 816, method 800 judges if the vehicle is in an economy mode. A vehicle may be in an economy mode when a driver selects economy mode via a display panel or switch. If method 800 judges that the vehicle is in an economy mode, the answer is yes and method 800 proceeds to 818. Otherwise, the answer is no and method 800 proceeds to 826.

At 818, method 800 judges battery SOC is greater than a threshold. In one example, the threshold may be an upper threshold limit (e.g., 75% of a fully charged battery). If method 800 judges that SOC is greater than the threshold, the answer is yes and method 800 proceeds to 822. Otherwise, the answer is no and method 800 proceeds to 820.

At 820, method 800 determines the maximum driveline torque based on the maximum engine torque determined at 802 and maximum DISG torque determined at 804. In one example, maximum driveline torque is determined from the following equation:

$$T_{drv\_mx}(\omega)=T_{eng\_mx}(\omega,bp,temp)+\lambda_3(\omega,P_d,MAP,SOC)\cdot T_{mot\_mx}(\omega,P_d,mtr\_tmp)$$

where $T_{drv\_mx}$ is maximum driveline torque, ω is driveline speed at the torque converter impeller, $T_{eng\_max}$ is maximum engine torque, by is ambient barometric pressure, temp is ambient temperature, $\lambda_3$ is a function limiting motor or DISG torque, $P_d$ is the battery discharge power limit, MAP is manifold pressure, SOC is battery state of charge, mtr_tmp is motor temperature, and $T_{mot\_mx}$ is maximum motor or DISG torque at the present battery discharge power limit and DISG temperature. In some examples, turbocharger turbine speed or engine torque may replace MAP such that $\lambda_3$ is a function of turbine speed or engine torque. Thus, the maximum engine torque determined at 802 is added to the product of the $\lambda_3$ function and the maximum DISG torque determined at 804.

In one example, the $\lambda_3$ is a function of the form shown in FIG. 5 where there is a curve 502-506 for each battery discharge power limit, but the maximum value of the $\lambda_3$ function is less than 1 (e.g., 0.75). Thus, the $\lambda_3$ output is a value from 0 to 0.75 that scales the maximum DISG torque. The $\lambda_3$ function may include a third dimension (e.g., z axis) based on MAP, engine torque, or turbine speed that adjusts the multiplier in the $\lambda_3$ function based on MAP, engine torque, or turbocharger turbine speed. Thus, in economy mode, the $\lambda_3$ function allows less than maximum DISG torque when the battery discharge limit is at its maximum level up to a predetermined driveline speed. At speeds higher than the predetermined speed, the $\lambda_3$ function output is zero, thereby making the DISG torque contribution to maximum driveline torque zero. In this way, battery energy that might have been used by the DISG at driveline speeds above the predetermined speed to improve vehicle acceleration and to increase the number of accelerations where maximum engine torque and maximum DISG torque may be applied.

The $\lambda_3$ function output may be adjusted in response to MAP such that maximum DISG torque is reduced (e.g., $\lambda_3$ output is reduced) when MAP exceeds a predetermined MAP (e.g., 1.05 bar). The $\lambda_3$ function output may be adjusted in response to engine torque such that maximum DISG torque is reduced (e.g., $\lambda_3$ output is reduced) when engine torque exceeds a predetermined torque. The $\lambda_3$ function output may be adjusted in response to turbocharger turbine speed such that maximum DISG torque is reduced (e.g., $\lambda_3$ output is reduced) when turbocharger turbine speed exceeds a predetermined turbine speed. Consequently, vehicle efficiency consistency may be improved by limiting maximum DISG torque and extending the number of DISG torque assisted vehicle accelerations. Method 800 proceeds to 855 after the maximum driveline torque is determined.

At 822, method 800 also determines the maximum driveline torque based on the maximum engine torque determined at 802 and maximum DISG torque determined at 804. In one example, maximum driveline torque is determined from the following equation:

$$T_{drv\_mx}(\omega) = T_{eng\_mx}(\omega, bp, temp) + \lambda_4(\omega, P_d, MAP, SOC) \cdot T_{mot\_mx}(\omega, P_d, mtr\_tmp)$$

where $T_{drv\_mx}$ is maximum driveline torque, w is driveline speed at the torque converter impeller, $T_{eng\_max}$ is maximum engine torque, by is ambient barometric pressure, temp is ambient temperature, $\lambda_4$ is a function limiting motor or DISG torque, $P_d$ is the battery discharge power limit, MAP is manifold pressure, SOC is battery state of charge, mtr_tmp is motor temperature, and $T_{mot\_mx}$ is maximum motor or DISG torque at the present battery discharge power limit and DISG temperature. In some examples, turbocharger turbine speed or engine torque may replace MAP such that $\lambda_4$ is a function of turbine speed or engine torque. Thus, the maximum engine torque determined at 802 is added to the product of the $\lambda_4$ function and the maximum DISG torque determined at 804.

In one example, the $\lambda_4$ is a function of the form shown in FIG. 6 or 7 where there is a curve 602-606 for each battery discharge power limit, but the maximum value of the $\lambda_4$ function is less than 1 (e.g., 0.75). Further, there is at least one of curve 620 and 722. Thus, the $\lambda_4$ output is a value from 0 to a predetermined value less than one (e.g., 0.75) that scales the maximum DISG torque. The $\lambda_4$ function may include a third dimension (e.g., z axis) based on MAP, engine torque, or turbocharger turbine speed. Thus, in economy mode, the $\lambda_4$ allows a fraction of maximum DISG torque when the battery discharge limit is at its maximum level up to an engine speed where peak engine torque occurs. At speeds higher than the speed where maximum engine torque occurs, the $\lambda_4$ function is zero for a middle speed range and then it increases at higher driveline speeds, thereby making the DISG torque contribution to maximum driveline torque zero during middle driveline speed and increasing the DISG torque at higher driveline speeds. In this way, battery energy that might have been used by the DISG at driveline speeds above middle range speeds may be applied at low driveline speeds to accelerate the vehicle and at higher driveline speeds to reduce battery capacity in preparation for the vehicle entering a regeneration mode.

The $\lambda_4$ function output may be adjusted in response to MAP such that DISG maximum torque is reduced (e.g., $\lambda_4$ output is reduced) when MAP exceeds a predetermined MAP (e.g., 1.05 bar). The $\lambda_4$ function output may be adjusted in response to engine torque such that maximum DISG torque is reduced (e.g., $\lambda_4$ output is reduced) when engine torque exceeds a predetermined torque. The $\lambda_4$ function output may be adjusted in response to turbocharger turbine speed such that DISG torque is reduced (e.g., $\lambda_4$ output is reduced) when turbocharger turbine speed exceeds a predetermined turbine speed. Consequently, vehicle efficiency consistency may be improved by limiting maximum DISG torque and extending the number of DISG torque assisted vehicle accelerations. Method 800 proceeds to 855 after the maximum driveline torque is determined.

At 826, method 800 judges if the vehicle is in tow mode. A vehicle may be in a tow mode when a driver selects tow mode via a display panel or switch or when a trailer is sensed coupled to the vehicle. If method 800 judges that the vehicle is in tow mode, the answer is yes and method 800 proceeds to 828. Otherwise, the answer is no and method 800 proceeds to 850.

At 828, method 800 judges battery SOC is greater than a threshold. In one example, the threshold may be an upper threshold limit (e.g., 75% of a fully charged battery). If method 800 judges that SOC is greater than the threshold, the answer is yes and method 800 proceeds to 832. Otherwise, the answer is no and method 800 proceeds to 830.

At 830, method 800 determines the maximum driveline torque based on the maximum engine torque determined at 802 and maximum DISG torque determined at 804. In one example, maximum driveline torque is determined from the following equation:

$$T_{drv\_mx}(\omega) = T_{eng\_mx}(\omega, bp, temp) + \lambda_5(\omega, P_d, SOC) \cdot T_{mot\_mx}(\omega, P_d, mtr\_tmp)$$

where $T_{drv\_mx}$ is maximum driveline torque, w is driveline speed at the torque converter impeller, $T_{eng\_max}$ is maximum engine torque, by is ambient barometric pressure, temp is ambient temperature, $\lambda_5$ is a function limiting motor or DISG torque, $P_d$ is the battery discharge power limit, SOC is battery state of charge, mtr_tmp is motor temperature, and $T_{mot\_mx}$ is maximum motor or DISG torque at the present battery discharge power limit and DISG temperature. Thus, the maximum engine torque determined at 802 is added to the product of the $\lambda_5$ function and the maximum DISG torque determined at 804.

In one example, the $\lambda_5$ is a function similar to one shown in FIG. 5, but the $\lambda$ curve begins at a value of one for low engine speeds and then decreases at an engine speed where maximum engine torque plus maximum DISG torque exceeds the maximum engine torque over the speed range (e.g., the engine torque of greatest value such as engine torque at 410 of FIG. 2). The $\lambda_5$ value decreases such that the maximum engine torque plus the maximum DISG torque is equal to the engine torque of greatest value over the driveline speed range. The $\lambda_5$ value is zero at speeds greater than the speed that engine torque is at its maximum value over the driveline speed range. The $\lambda_5$ function may include a third dimension (e.g., z axis) based on SOC that adjusts the multiplier in the $\lambda_5$ function based on SOC. Thus, in tow mode, the $\lambda_5$ function limits the maximum driveline torque to the maximum engine torque over the speed range up to the speed of the maximum engine torque. At driveline speeds greater than the speed where maximum engine torque over the speed range occurs, the $\lambda_5$ value is zero so that the DISG does not provide torque to the driveline. In this way, battery energy may be used at lower driveline speed to provide a maximum driveline torque that is equal to the maximum engine torque over the driveline speed range. Consequently, the driveline torque may be more uniform and the uniformity may be provided for more vehicle launches. Method 800 proceeds to 855 after the maximum driveline torque is determined.

At 832, method 800 also determines the maximum driveline torque based on the maximum engine torque determined at 802 and maximum DISG torque determined at 804. In one example, maximum driveline torque is determined from the following equation:

$$T_{drv\_mx}(\omega) = T_{eng\_mx}(\omega, bp, temp) + \lambda_6(\omega, P_d, MAP, SOC) \cdot T_{mot\_mx}(\omega, P_d, mtr\_tmp)$$

where $T_{drv\_mx}$ is maximum driveline torque, co is driveline speed at the torque converter impeller, $T_{eng\_max}$ is maximum engine torque, by is ambient barometric pressure, temp is ambient temperature, $\lambda_6$ is a function limiting motor or DISG torque, $P_d$ is the battery discharge power limit, MAP is manifold pressure, SOC is battery state of charge, mtr_tmp is motor temperature, and $T_{mot\_mx}$ is maximum motor or DISG torque at the present battery discharge power limit and DISG temperature. In some examples, turbocharger turbine speed or engine torque may replace MAP such that $\lambda_6$ is a function of turbine speed or engine torque. Thus, the maximum engine torque determined at 802 is added to the product of the $\lambda_6$ function and the maximum DISG torque determined at 804 to provide a revised maximum DISG torque.

In one example, the $\lambda_6$ is a function of the form shown in FIG. 6 or 7, but the $\lambda$ curve begins at a value of one for low engine speeds and then decreases at an engine speed where maximum engine torque plus maximum DISG torque exceeds the maximum engine torque over the speed range (e.g., the engine torque of greatest value such as engine torque at 410 of FIG. 2). The $\lambda_6$ value decreases such that the maximum engine torque plus the maximum DISG torque is equal to the engine torque of greatest value over the driveline speed range. The $\lambda_6$ value is zero at speeds greater than the speed that engine torque is at its maximum value over the driveline speed range, but it increases above a threshold speed to prepare battery cells for regeneration mode (e.g., curve 620 of FIG. 6). Method 800 proceeds to 855 after maximum driveline torque is determined.

At 850, method 800 enters a sustain charge mode where maximum driveline torque over the driveline is equated to maximum engine torque. Thus, if a driver fully depresses an accelerator pedal to a wide open pedal (WOP), the maximum driveline torque is maximum engine torque at the particular speed the driveline is rotating. Consequently, battery charge does not have to be provided to the DISG to meet driver demand torque and battery charge may be sustained.

Thus, the method of FIG. 8 provides for a driveline method, comprising: adjusting a maximum driveline torque threshold in response to driveline speed and a battery discharge power limit; and limiting driveline torque in response to the maximum driveline torque threshold. The method includes where limiting driveline torque includes limiting current supplied to an electric machine. The method includes where the driveline torque threshold includes a plurality of torque threshold values over a driveline speed range. The method includes where the plurality of torque threshold values are based on a sum of maximum engine torque threshold values and maximum electric machine torque threshold values over the driveline speed range.

In one example, the method includes where the driveline torque threshold is based on maximum engine torque values at a plurality of driveline speeds and maximum electric machine torque values at the plurality of driveline speeds for driveline speeds less than a driveline speed where engine torque is a maximum value over an entire driveline speed range, and where the driveline torque threshold is based solely on maximum engine torque values at driveline speeds greater than the driveline speed where engine torque is a maximum value over the entire driveline speed range. The method further comprises reducing the driveline torque threshold in response to boost pressure. The method includes where the driveline torque threshold is adjusted to a maximum engine torque over an entire driveline speed range at driveline speeds below a threshold driveline speed. The method includes where the threshold speed is a speed where the maximum engine torque over the entire driveline speed range is.

The method of FIG. 8 also provides for a driveline method, comprising: providing a driveline torque threshold based on a sum of maximum engine torque and maximum electric machine torque in a first driveline speed range; providing the driveline torque threshold in a second driveline speed range based only on maximum engine torque, speeds in the second driveline speed range greater than speeds in the first driveline speed range; and limiting driveline torque to the driveline torque threshold. The method includes where the driveline torque threshold is a maximum driveline torque threshold.

In some examples, the method includes where the driveline torque threshold in the first driveline speed range and the driveline torque threshold in the second speed range are based on maximum electric machine torque multiplied by a value that is a function of driveline speed and an electric machine discharge power limit. The method further comprises providing the driveline torque threshold in a third driveline speed range, speeds in the third speed range greater than speeds in the second speed range, the driveline torque threshold in the third driveline speed range being based on a sum of maximum engine torque and maximum electric machine torque. The method includes where the driveline torque threshold is a basis for limiting the driveline torque during wide open pedal position conditions.

The method further comprises adjusting the driveline torque threshold based on one of a plurality of driver selected modes. The method also includes where one of the plurality of driver selected modes is a tow mode, and where the driveline torque threshold is adjusted to a maximum engine torque over an entire driveline speed range at driveline speeds where maximum engine torque is less than the maximum engine torque over the entire driveline speed range.

It should also be noted that additional modes may be added to the method of FIG. 8. For example, a city driving mode or a highway driving mode may be added. In each mode, a new $\lambda$ function may be applied to adjust the maximum DISG torque, thereby adjusting the maximum driveline torque.

As will be appreciated by one of ordinary skill in the art, the methods described in FIG. 8 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system. In the context of this disclosure, a limit is a value or threshold that is not to be exceeded or a value or threshold other parameters are prevented from going above when the limit is in effect. A maximum is a value or threshold which parameters associated with the maximum are maintained below at all times the maximum is in effect. For example, maximum electric machine torque is a torque threshold below which electric machine torque is maintained while the maximum electric machine torque is in effect. This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A driveline method, comprising:
    adjusting a maximum driveline torque threshold in response to driveline speed and a battery discharge power limit;
    limiting driveline torque in response to the maximum driveline torque threshold; and
    reducing the maximum driveline torque threshold in response to boost pressure.

2. The method of claim 1, where limiting driveline torque includes limiting current supplied to an electric machine.

3. The method of claim 1, where the maximum driveline torque threshold includes a plurality of torque threshold values over a driveline speed range.

4. The method of claim 3, where the plurality of torque threshold values is based on a sum of maximum engine torque threshold values and maximum electric machine torque threshold values over the driveline speed range.

5. The method of claim 1, where the maximum driveline torque threshold is based on maximum engine torque values at a plurality of driveline speeds and maximum electric machine torque values at the plurality of driveline speeds for driveline speeds less than a driveline speed where engine torque is a maximum value over an entire driveline speed range, and where the maximum driveline torque threshold is based solely on maximum engine torque values at driveline speeds greater than the driveline speed where engine torque is the maximum value over the entire driveline speed range.

6. The method of claim 1, where the maximum driveline torque threshold is adjusted to a maximum engine torque over an entire driveline speed range at driveline speeds below a threshold driveline speed.

7. The method of claim 6, where the threshold driveline speed is a speed where the maximum engine torque over the entire driveline speed range is available.

8. A driveline method, comprising:
    providing a driveline torque threshold based on a sum of maximum engine torque and revised maximum electric machine torque in a first driveline speed range;
    providing the driveline torque threshold in a second driveline speed range based only on maximum engine torque, speeds in the second driveline speed range greater than speeds in the first driveline speed range; and
    limiting driveline torque to the driveline torque threshold.

9. The method of claim 8, where the driveline torque threshold is a maximum driveline torque threshold.

10. The method of claim 8, where the driveline torque threshold in the first driveline speed range and the driveline torque threshold in the second speed range are based on maximum electric machine torque multiplied by a value that is a function of driveline speed and an electric machine discharge power limit.

11. The method of claim 8, further comprising providing the driveline torque threshold in a third driveline speed range, speeds in the third speed range greater than speeds in the second speed range, the driveline torque threshold in the third driveline speed range being based on a sum of maximum engine torque and maximum electric machine torque.

12. The method of claim 8, where the driveline torque threshold is a basis for limiting the driveline torque during wide open pedal position conditions.

13. The method of claim 8, further comprising adjusting the driveline torque threshold based on one of a plurality of driver selected modes.

14. The method of claim 13, where one of the plurality of driver selected modes is a tow mode, and where the driveline torque threshold is adjusted to a maximum engine torque over an entire driveline speed range at driveline speeds where maximum engine torque is less than the maximum engine torque over the entire driveline speed range.

15. A driveline system, comprising:
    an engine;
    an electric machine;
    a driveline disconnect clutch selectively coupling the engine and the electric machine; and
    a controller including executable instructions stored in non-transitory memory for closing the driveline disconnect clutch and limiting driveline maximum torque to less than a sum of maximum engine torque and maximum electric machine torque.

16. The driveline system of claim 15, where driveline maximum torque is an amount of torque the electric machine and engine simultaneously output in response to a wide open pedal position.

17. The driveline system of claim 15, where maximum electric machine torque is limited based on a function of driveline speed independent from electric machine operating characteristics.

18. The driveline system of claim 15, where maximum electric machine torque is limited based on a function of a battery discharge power limit.

19. The driveline system of claim 15, where the maximum electric machine torque is limited based on a maximum engine torque over a driveline speed range.

* * * * *